(12) United States Patent
Deng

(10) Patent No.: US 11,732,651 B2
(45) Date of Patent: Aug. 22, 2023

(54) SUPERCRITICAL CO2 POWER CYCLE WITH DRY REFORMING OF METHANE

(71) Applicant: Mitsubishi Power Americas, Inc., Lake Mary, FL (US)

(72) Inventor: Shimin Deng, Oakville (CA)

(73) Assignee: Mitsubishi Power Americas, Inc., Lake Mary, FL (US)

(*) Notice: Subject to any disclaimer, the term of this patent is extended or adjusted under 35 U.S.C. 154(b) by 221 days.

(21) Appl. No.: 17/195,139

(22) Filed: Mar. 8, 2021

(65) Prior Publication Data
US 2022/0282671 A1    Sep. 8, 2022

(51) Int. Cl.
| | | |
|---|---|---|
| *F02C 3/34* | (2006.01) | |
| *F02C 7/22* | (2006.01) | |
| *F02C 3/04* | (2006.01) | |
| *F02C 6/00* | (2006.01) | |
| *F02C 3/24* | (2006.01) | |

(52) U.S. Cl.
CPC .................. *F02C 7/22* (2013.01); *F02C 3/04* (2013.01); *F02C 3/24* (2013.01); *F02C 3/34* (2013.01); *F02C 6/00* (2013.01); *F05D 2220/32* (2013.01); *F05D 2220/76* (2013.01)

(58) Field of Classification Search
CPC combination set(s) only.
See application file for complete search history.

(56) References Cited

U.S. PATENT DOCUMENTS

| | | | |
|---|---|---|---|
| 10,227,901 B2 | 3/2019 | Bergins et al. | |
| 2012/0144837 A1* | 6/2012 | Rasmussen | F25J 3/04533 60/39.19 |

(Continued)

FOREIGN PATENT DOCUMENTS

| | | |
|---|---|---|
| DE | 102022105434 A1 | 9/2022 |
| JP | 2002004877 | 1/2002 |

(Continued)

OTHER PUBLICATIONS

"Chapter 4: Technology Assessments—Supercritical Carbon Dioxide Brayton Cycle", Quadrennial Technology Review 2015 DOE, (2015), 29 pgs.

(Continued)

*Primary Examiner* — Gerald L Sung
(74) *Attorney, Agent, or Firm* — Schwegman Lundberg & Woessner, P.A.

(57) ABSTRACT

A power plant comprises a combustor for combusting first and second constituents to generate a gas stream, a turbine for rotation by the gas stream, a compressor to receive a first portion of the gas stream and provide compressed gas to the combustor, a recompressor configured to receive a second portion of the gas stream and provide compressed gas to the combustor, a generator to be driven by the turbine, and a methane reforming reactor configured to dry reform methane to provide the first constituent. A method of operating a power plant comprises operating a supercritical CO2 power cycle to turn a turbine, driving a generator with the turbine, extracting CO2 byproduct from the power cycle, reacting fuel and CO2 to produce a synthesis gas in a dry reforming of methane reactor, and mixing the synthesis gas with oxygen to execute a combustion process for the power cycle.

22 Claims, 4 Drawing Sheets

(56) References Cited

U.S. PATENT DOCUMENTS

2019/0376190 A1* 12/2019 O'Brien .................... F02C 3/34
2020/0317515 A1* 10/2020 O'Neal ................... C01B 3/384
2020/0407298 A1* 12/2020 Lourenco ............... C10G 50/00

FOREIGN PATENT DOCUMENTS

| JP | 2017529478 | 10/2017 |
|---|---|---|
| WO | 2016007509 | 1/2016 |

OTHER PUBLICATIONS

"High Inlet Temperature Combustor for Direct Fired Supercritical Oxy-Combustion", Southwest Research Institute and Thar Energy L.L.C., University Turbine Systems Research Workshop, Work supported by US DOE under DE-FE002401, (2015), 44 pgs.

Hosseini, M, "Advances in Feedstock Conversion Technologies for Alternative Fuels and Bioproducts—New Technologies, Challenges, and Opportunities", Woodhead Publishing Series in Energy, Kingston, UK., (2019).

Jin, H, et al., "A Chemically Intercooled Gas Turbine Cycle for Recovery of Low-Temperature Thermal Energy", (2006), pp. 1554-1566.

Kumar, A, "Low Temperature Activation of Carbon Dioxide by Ammonia in Methane Dry Reforming—A Thermodynamic Study", Catalysts, 8, 481, (2018).

Takami, D, et al., "Low Temperature Dry Reforming of Methane over Plasmonic Ni Photocatalysts under Visible Light Irradiation", Sustainable Energy & Fuels, 11, (2019).

"Japanese Application Serial No. 2022-34271, Notification of Reasons for Rejection dated Mar. 28, 2023", W English Translation, 6 pgs.

* cited by examiner

SUPERCRITICAL CO2 POWER CYCLE WITH DRY REFORMING OF METHANE

TECHNICAL FIELD

This document pertains generally, but not by way of limitation, to power cycles used to convert heat to electricity. More specifically, but not by way of limitation, the present application relates to supercritical CO2 power cycles wherein carbon dioxide (CO2) is used in a super critical state where liquid and gas phases are not distinguishable.

BACKGROUND

In a gas turbine combined-cycle ((TCC) power plant, a gas turbine engine can be operated to directly generate electricity with a generator using shaft power. Hot exhaust gas of the gas turbine engine can additionally be used to generate steam within a heat recovery steam generator (HRSG) that can be used to rotate a steam turbine shaft to further produce electricity. Working fluid for the GTCC typically comprises air and/or gas (for topping cycle) and steam and/or water (for bottoming cycle) and a gas or liquid fuel is burned in the gas turbine engine.

As renewable energy gains a greater foothold in energy production, other types of power cycles are being explored. Supercritical CO2-based power cycles (sCO2 power cycles) have shown the potential for increased heat-to-electricity conversion efficiencies, high power density, and simplicity of operation compared to conventional power cycles. In addition, sCO2 power cycles can use small-sized turbomachinery due to the use of high pressures and CO2 having higher power density than air. These factors can make the cycle appealing to a wide range of applications and stakeholders.

The sCO2 power cycle can be implemented in indirectly and directly heated (i.e., fired) applications. The indirectly heated power cycle is applicable to boiler-type plants where the combustion gases and cycle working fluid are separated. In the directly heated sCO2 power cycle, the combustion of fuel (natural gas or syngas (CO and H2)) and oxygen (O2) produces a first stream of exhaust gas and a second stream of CO2 that mixes with the first stream, with the mixed streams being used as the working fluid to drive the turbine and produce power. The directly heated sCO2 power cycle has two main features: a) the turbine can operate at a higher turbine inlet temperature (TIt) than that of the indirect-heated cycle; b) it can produce a high purity stream of CO2 that is ready for storage, without expensive and energy-intensive capture/separation technologies.

OVERVIEW

The present inventor has recognized, among other things, that problems to be solved in sCO2 power cycle power plants in general can include the need to improve efficiency of the conversion of heat to electricity to among, other things, reduce emissions. One such symptom of this problem is the production of power cycle byproducts, and the inefficient use, or the absence of use, of these byproducts.

The present subject matter can help provide solutions to the problem of inefficient electric power production and other problems by improving thermal efficiency of the directly heated sCO2 power cycle. In examples, a Dry Reforming of Methane (DRM) process can be used to react CO2 with methane to improve the thermal efficiency of a sCO2 power cycle. The DRM process can convert the CO2 and methane fuel into synthesized fuel (e.g., syngas) for the sCO2 power cycle that can produce a higher output of energy in the combustion process. The DRM process can simultaneously utilize an available heat source, such as free heat from solar energy or not-free waste heat from an industrial process to supplement the DIM process. As such, the overall efficiency of the sCO2 cycle can be increased by integrating DRM with the sCO2 cycle itself and a cheaply or freely available heat source.

In an example, a supercritical CO2 cycle power plant can comprise a combustor configured to combust first and second input constituents to generate a gas stream, a turbine configured to be rotated by the gas stream, a compressor configured to receive a first portion of the gas stream from the turbine and provide a first stream of compressed gas to the combustor, a recompressor configured to receive a second portion of the gas stream from the turbine and provide a second stream of compressed gas to the combustor, an electrical generator configured to be driven by the turbine, and a methane reforming reactor configured to dry reform methane to provide the first input constituent.

In another example, a method of operating a supercritical CO2 cycle power plant can comprise reacting a fuel and CO2 to produce a synthesis gas in a reactor, mixing the synthesis gas with oxygen to execute a combustion process and generate an exhaust gas (e.g., CO2 and steam), turning a turbine with the exhaust gas, driving an electrical generator with the turbine, routing the exhaust gas through a compressor and a recompressor to generate pressurized gas, and routing the pressurized gas through a two-stage recuperation process to provide heated and compressed CO2 to the combustor.

In an additional example, a method of operating a supercritical CO2 cycle power plant can comprise operating a supercritical CO2 power cycle to turn a turbine, driving an electrical generator with the turbine, extracting CO2 byproduct from the supercritical CO2 power cycle, reacting a fuel and a portion of the CO2 byproduct to produce a synthesis gas in a dry reforming of methane (DRM) reactor, and mixing the synthesis gas with oxygen to execute a combustion process for the supercritical CO2 power cycle.

In an example, a supercritical CO2 cycle power plant comprises a supercritical CO2 power cycle configured to produce a gas stream including CO2, a turbine configured to be rotated by the gas stream, an electrical generator configured to be driven by the turbine, and a methane reforming reactor configured to dry reform methane using CO2 from the gas stream to provide synthesis gas to a combustion process of the supercritical CO2 power cycle.

This overview is intended to provide an overview of subject matter of the present patent application. It is not intended to provide an exclusive or exhaustive explanation of the invention. The detailed description is included to provide further information about the present patent application.

Figure 1:
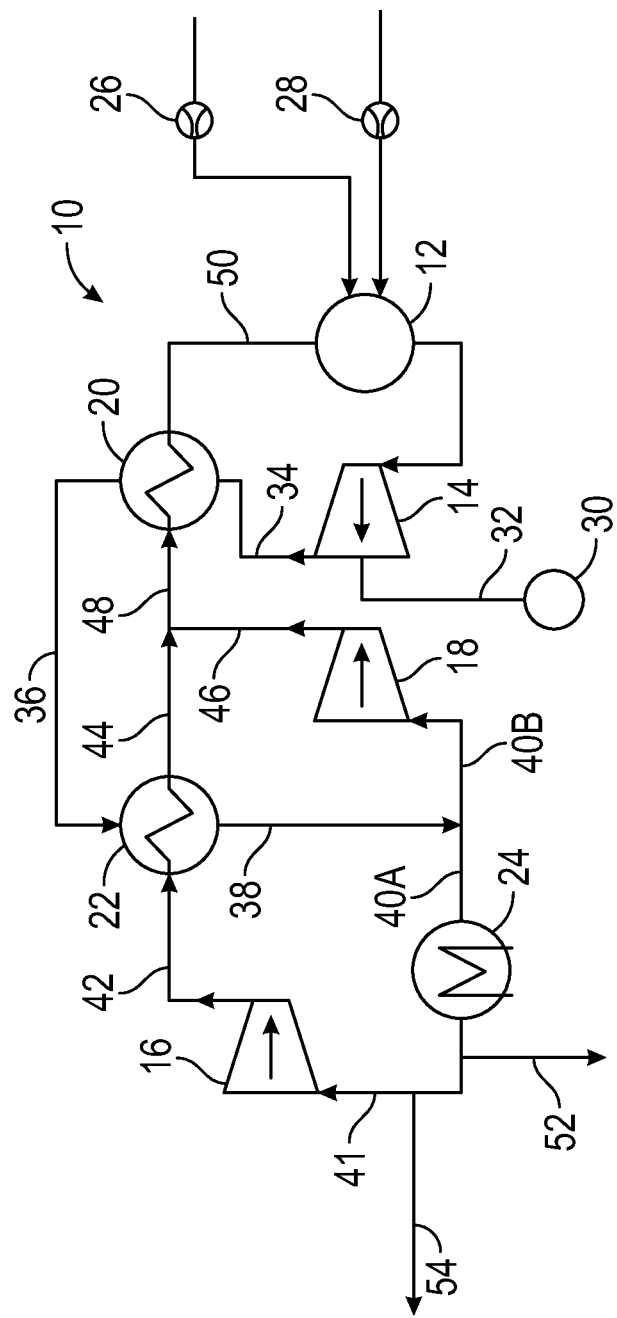
FIG. 1 is a schematic diagram illustrating a typical supercritical CO2 power cycle using oxygen and natural gas as an input and producing power with CO2 as a byproduct.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

FIG. 1 is a schematic diagram illustrating supercritical CO2 (sCO2) power cycle 10. The sCO2 power cycle can comprise combustor 12, turbine 14, compressor 16, re-compressor 18, high temperature (HT) recuperator 20, low temperature (LT) recuperator 22 and cooler 24. Oxygen can be provided to combustor 12 via oxygen compressor 26 and natural gas can be provided to combustor 12 via fuel compressor 28. As discussed in greater detail below, oxygen and natural gas can be burned in combustor 12 to produce high-pressure and high-temperature gas for rotating turbine 14, which can be used to drive electrical generator 30.

Oxygen and natural gas from compressors 26 and 28, respectively, can be provided to combustor 12. Oxygen and natural gas can be provided to compressors 26 and 28 from an external source or storage tanks. The oxygen and natural gas can be combusted, e.g., burned, in combustor 12 to generate a hot exhaust gas that can drive turbine 14. Combustor 12 can be configured as an auto-ignition style combustor that is capable of operating with a very high temperature of working fluid at the combustor inlet (e.g., —1000"C). Turbine 14 can be connected to generator 30 via shaft 32. Thus, generator 30 can be directly driven by turbine 14 to output electricity, such as to a grid network.

Turbine 14 can also be connected to compressor 16 and re-compressor 18. In examples, compressor 16 and re-compressor 18 can be directly driven by turbine 14 via one or more shafts or shafting systems. After being used to drive turbine 14, exhaust gas from combustor 12 can flow through HT recuperator 20 via line 34, through LT recuperator 22 via line 36 and into line 38 for feeding compression lines 40A and 40B. Exhaust gas can be split into line 40A and 40B for flowing separately through compressor 16 and re-compressor 18. Exhaust gas from line 40A can flow into cooler 24, into compressor 16 via line 41, and then to LT recuperator 22 via line 42 before entering line 44. Exhaust gas from line 40B can flow into re-compressor 18 and then to HT recuperator 20 via lines 46 and 48. Heat can be added to exhaust gas flowing from line 42 to line 44 by LT recuperator 22 and heat can be added to exhaust gas flowing from line 48 to line 50 via high temperature recuperator 20. This added heat can improve the efficiency of the sCO2 cycle. Exhaust gas from LT recuperator 22 at line 44 can be rejoined with exhaust gas from line 46 for entry into HT recuperator 20 at line 48. The heated gas can be returned to combustor 12 via line 50 to be combined into the combustion process.

In the sCO2 power cycle, a fixed or semi-fixed amount of CO2 is recycled through power cycle 10. Combustion of fuel, such as natural gas can result in CO2 being added to the system. However, excess CO2 can be extracted at outlet 54. CO2 can be extracted and stored for other external uses or directed to a pipeline for transportation to other locations, to maintain balance of power cycle 10. Excess steam in line 41 in the system can be extracted at outlet 52 after condensing by cooler 24. Cooler 24 can be coupled to a source of cold fluid or gas to cool exhaust gas flowing between lines 40A and 41 to reduce the temperature of the working fluid to close to ambient temperature. In examples, pure, or nearly pure, CO2 can remain as the working fluid after outlet 52 where water is removed.

The configuration of a typical directly-fired sCO2 power cycle, as illustrated in FIG. 1, differs from a typical Brayton cycle by the combustor. In sCO2 power cycle 10, fuel is combusted with pure oxygen, wherein a slight excess of oxygen is used in an oxy-fuel combustion process. In the Brayton cycle, an excess of air is used in the combustion process. As shown in FIG. 1, for achieving higher efficiency, exhaust heat from turbine 14 is recovered through recuperators 20 and 22 for heating gas at outlet of the compressor 16. This two-stage recuperation process and the use of recompressor 18 are designed to improve the heat transfer profile in recuperators 20 and 22 for achieving higher power cycle efficiency.

It is predicted that thermal efficiency of a directly-fired sCO2 power cycle achieves 64% when combustor inlet pressure/turbine: inlet temperature is 300 bar/1200° C., respectively.

The present inventor has recognized that the efficiency of sCO2 power cycles can be increased using the systems and methods described herein. The present inventor has recognized that typical sCO2 fuel, e.g., natural gas, can include a large constituent of methane, i.e., CH4. The present inventor has also recognized that typical sCO2 power cycles produce CO2 as a byproduct. The present inventor has combined these features of sCO2 power cycles to improve the overall system efficiency. In particular the present inventor has incorporated a Dry Reforming of Methane (DRM) reactor into a sCO2 power cycle to convert a portion of a natural gas filet provided to an sCO2 power cycle into a higher energy syngas using the CO2 byproduct of the sCO2 system as a chemical feedstock. Thus, a higher energy fuel can be burned in combustor 12 to increase the efficiency of power cycle 10 and greenhouse gas emissions can be reduced. Additionally, the present inventor has recognized that a heat exchanger can be used between the inputs and outputs of the DRM reactor to improve the efficiency of the DRM reaction and a compressor that receives the outputs. Furthermore, heat required by the DRM reactor can be added from an external source that can provide cheap or free heat.

Figure 2:
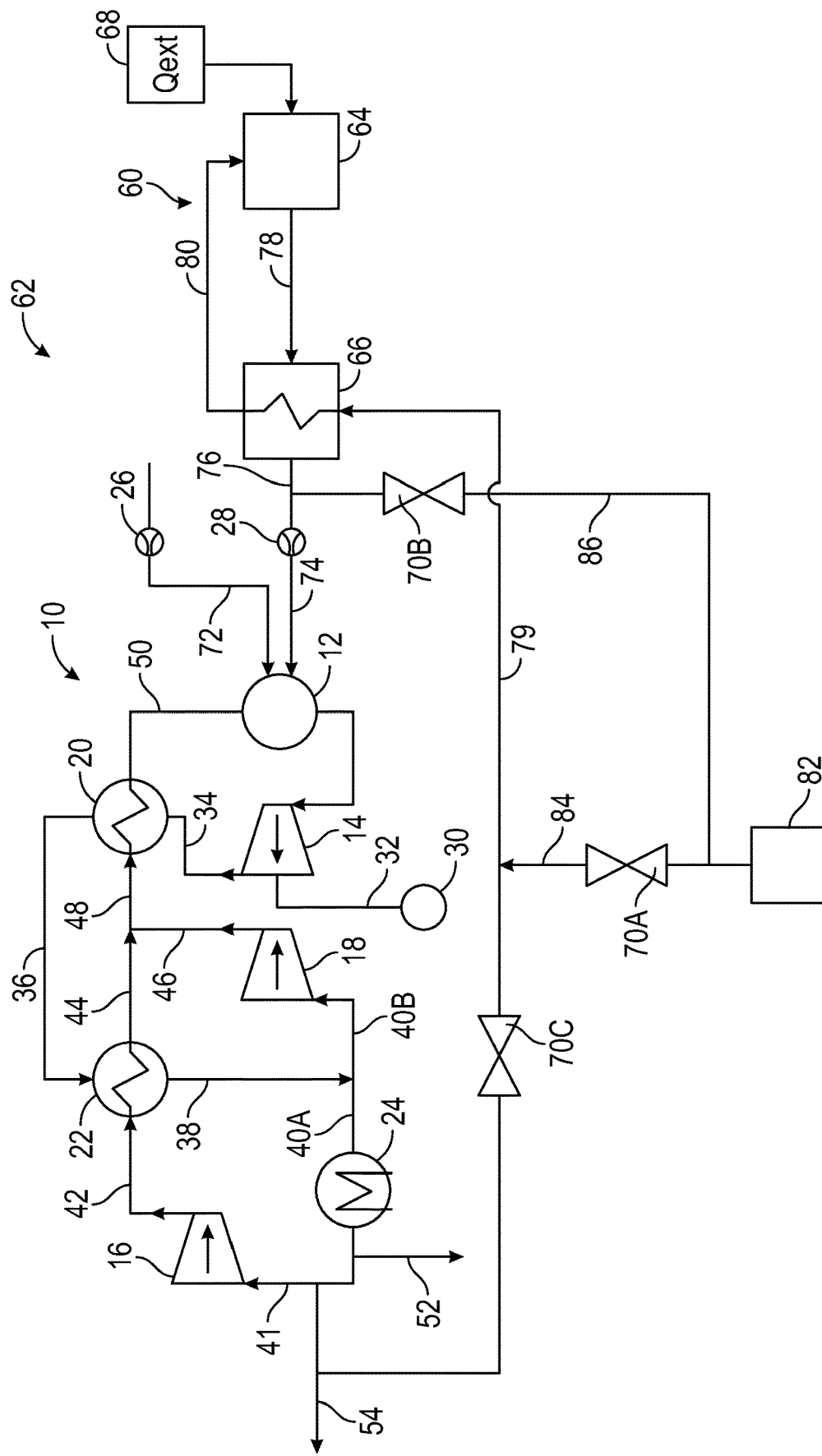
FIG. 2 is a schematic flow diagram illustrating a supercritical CO2 power cycle incorporating a Dry Reforming of Methane reactor to convert CO2 and methane into syngas.

FIG. 2 is a schematic diagram illustrating supercritical CO2 power cycle 10 of FIG. 1 having DRM system 60 incorporated therein to produce combined power system 62. DRM system 60 can comprise reactor 64, heat exchanger 66, heat source 68 and valves 70A, 70B and 70C. Oxygen compressor 26 can be connected to combustor 12 via line 72. Fuel compressor 28 can be connected to combustor 12 via line 74. Heat exchanger 66 can be connected to the inlet of fuel compressor 28 via line 76. DRM reactor 64 can be coupled to heat exchanger 66 via line 78. Outlet 54 for CO2 can be connected to heat exchanger 66 via line 79. Heat exchanger 66 can be connected to DRM reactor 64 via line 80. Fuel source 82 can either be connected to line 79 via line 84 or directly connected to line 76 via line 86. Valve 70C can be positioned in line 79 between outlet 54 and line 84. Valve 70A can be positioned in line 84 between line 79 and fuel source 82. Valve 70B can be positioned in line 86 between fuel source 82 and line 76.

Fuel source 82 can comprise a source of fuel that can at least be partially reacted in DRM reactor 64. In examples, fuel source 82 can provide natural gas to DRM reactor 64.

Natural gas can be comprised of a mixture of methane, ethane, propane and butane, and combinations thereof. In some examples, the natural gas can comprise, or can be processed to only or mostly (e.g., ~95%) comprise methane, which has the chemical composition of CH4. Methane can be used in DRM reactor 64, along with carbon dioxide (CO2) from outlet 54, to produce syngas, which is a mixture of carbon monoxide (CO) and hydrogen (H2). Syngas can be burned to provide greater energy input to combustor 12 as compared to conventional natural gas, thereby achieving higher efficiency of combined power system 62 as a whole.

During operation of sCO2 power cycle 10 only, valves 70A and 70C can be closed and valve 70B can be opened. As such, fuel from fuel source 82 can be provided directly to fuel compressor 28, thereby bypassing DRM reactor 64 and heat exchanger 66. Power cycle 10 can be configured to operate in such a configuration when DRM system 60 is not operating due to maintenance or when heat source 68 is not available. For example, heat source 68 can comprise a solar energy source that is unavailable due to weather conditions. Heat source 68 can also comprise an industrial process that is temporarily not operating. Heat source 68 is discussed in greater detail below.

To operate sCO2 power cycle 10 in combination with DRM reactor 64, valve 70B can be closed and valves 70A and 70C can be opened. As such, fuel cannot bypass DRM reactor 64 in line 86. Fuel is, therefore, provided through line 79 to DRM reactor 64. In an example, fuel is provided to DRM reactor 64 at ambient temperature. The fuel is added to a flow of CO2 already present in line 79 from outlet 54. The mixture of fuel and CO2 is first passed through heat exchanger 66 before being directed into DRM reactor 64. Heat exchanger 66 can put the inputs to DRM reactor 64 in a heat exchange relationship with the outputs of DRM reactor 64. In examples, heat exchanger 66 is configured to transfer heat from the outputs of DRM reactor 64 to the inputs of DRM reactor 64 in order to reduce the temperature of the fuel in line 76. which can, for example, help the compression process of fuel compressor 28. Reducing the operating burden of compressor 28 can increase the overall efficiency of power cycle 10. As such, incorporation of heat exchanger 66 into DRM system 60 can, in various examples, permit efficient integration of power cycle 10 with DRM system 60.

Once within DRM reactor, the CO2 and methane components of the natural gas can be reacted according to Equation [1],

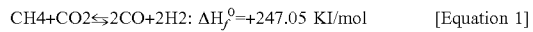

Equation [1] shows that, with the addition of heat ($\Delta H_f^o$), the combination of methane (CH4) with an inert (e.g., non-combustible) component (CO2) can be converted to two combustible components (CO and H2). CO and H2 thus represent a higher potential energy as fuel for combustor 12. Thus, if heat source 68 can be combined with DRM reactor 64, the overall efficiency of combined power system 62 can be improved due to higher energy fuel being provided.

The reaction temperature has typically been higher than 700° C. to avoid coking formation, However, a recent study indicates that low-temperature DRM can be achieved over plasmonic Ni/Al2O3 photocatalyst using a fixed-bed flow reactor at 200° C. Low-temperature DRM processes can facilitate integration with sCO2 systems as described herein.

As can be seen in Equation [1], the DRM reaction process consumes CO2, thereby reducing greenhouse gas emissions. Equation [1] also indicates that this is a highly endothermic reaction, e.g., energy is absorbed. Accordingly, in order to offset the energy needed for the DRM reaction, heat source 68 can add heat to :DIM reactor 64. Heat source 68 can comprise an industrial process that gives off heat. In examples, heat source 68 can comprise heat available from the environment, such as solar thermal heat or geothermal heat. In additional examples, heat source 68 can comprise steam from a nearby power plant, such as low-pressure steam or steam from a Heat Recovery Steam Generator (HRSG). Transfer of heat from the synthesis gas at the DRM reactor 64 output at line 78 to the DRM reactor inputs of natural gas and CO2 via the heat exchanger 66 not only reduces the operating burden of compressor 28, but also reduces the amount of heat necessary from heat source 68 to drive the reaction.

In examples, DRM reactor 64 can comprise part of an industrial process. For example, such industrial processes can be utilized for energy conversion such as Fischer-Tropsch (FT), carbonylation, and hydroformylation, and for the syntheses of fuels and high value-added chemicals, DRM reactor 64 can be located upstream of fuel compressor 28 and can operate at a pressure close to natural gas pipeline pressure.

For the combined power system 62, a certain amount of heat energy is required for the DRM reaction. This endothermic reaction can take place at 200° C., so the external heat source can be a low-grade level, as discussed above with reference to heat source 68, that is, in examples, cheaply or freely available. In examples, heat exchanger 66 can be configured to heat input to DRM reactor 64 to approximately 200° C. for the reaction, such as by using the aforementioned plasmonic Ni/Al2O3 photocatalyst process. Heat exchanger 66 can be used to increase the temperature of the fuel for DRM reactor 64 to facilitate this process, which reduces the amount of external heat required to be supplied from heat source 68.

As mentioned, heat exchanger 66 can simultaneously reduce the temperature of the syngas and unreacted methane to, for example, lower the power consumption of fuel compressor 28. With reference to Equation [1], because of the increase in fuel volumetric flow rate (due to fewer number of moles of gas on left side than right side in the reaction equation), the fuel compressor can consume more power than the standalone sCO2 power cycle. Use of heat exchanger 66 reduces the energy requirements of both the compressor 28 and heat source 68 to synergistically increase the efficiency of the combined power system 62. Combustor 12 can be designed to accommodate the difference in fuel property, such as the burning of a mixture of unconverted natural gas and syngas vs. natural gas only for the standalone sCO2 power cycle, as well as the volumetric flow rate differences.

TABLE 1

Performance Comparison of sCO2 Cycle vs sCO2Cycle + DRM with Free Heat and with Not free Heat

| Cases | | 1 sCO2 Cycle | 2 sCO2 Cycle + DRM |
|---|---|---|---|
| Gross power output | MW | 500 | 500 |
| Efficiency of sCO2 cycle | %, LHV | 64 | 64 |
| Heat input to combustor | MWth, LHV | 781.3 | 781.3 |
| Heat input of natural gas fuel | MWth, LHV | 781.3 | 736 |
| Overall gross efficiency | %, LHV | 64 | 67.9 |
| Increase in gross efficiency | % points, LHV | — | 3.9 |
| Additional power of fuel compressor | MW | — | 3.9 |

TABLE 1-continued

Performance Comparison of sCO2 Cycle vs sCO2Cycle + DRM with Free Heat and with Not free Heat

| Cases | | 1 sCO2 Cycle | 2 sCO2 Cycle + DRM |
|---|---|---|---|
| Overall efficiency - Free Heat | %, LHV | 64 | 67.4 |
| Increase in overall efficiency - Free Heat | % points, LHV | — | 3.4 |
| Additional/equivalent power by Qext | MW | — | 10 |
| Overall efficiency - considering Qext | %, LHV | 64 | 66 |
| Increase in overall efficiency - considering Qext | % points, LHV | — | 2 |

Table 1 shows calculations for the operation of power cycle 10 alone (1) versus operation of power cycle 10 integrated with DIM system 60 (2). Table 1 shows equivalent gross power output of processes (1) and (2), operating the same electric generator 30. Therefore, the heat input to the combustor is the same, which is expected because both processes are operating the same components, such as turbine 14, compressor 16, recompressor 18, and recuperators 20 and 22. As such, the efficiency of sCO2 power cycle 10 is the same in each process. However, process (2) of combined power system 62 achieves efficiency savings due to the reduced use of natural gas. That is, DRM reactor 64 converts the combination of natural gas and CO2 into a higher energy fuel (synthesis gas), such that less natural gas (736 MWth) is used as an input to provide the same thermal energy (781.3 MWth) to the combustor 12. Table 1 further shows that because process (2) has an increase in compressor power usage of 3.9 MW, the theoretical process efficiency is reduced from 67.9% to 67.4%. As described herein, the compressor power consumption is reduced by the use of heat exchanger 66. As such, if Qext is freely available as waste heat from another industrial process or from solar energy, the combined power system of process (2) shows an overall efficiency increase of 3.4% points, LHV. However, if Qext is not freely available and the cost of the external heat, e.g., heat source 68, is accounted for, the overall efficiency is increased only 2% points, LHV. Stated another way, Table 1 shows that Case 2 is significantly more efficient than Case 1, and overall efficiency is increased by 3.4%points (debit of Qext not considered) or 2.0% points (debit of Qext considered).

It is noted that calculations for Table 1 are based on calculations for the DRM process showing that, in an example, 45.2 MWth of external heat energy is required for the DRM reaction which represents 6.1% of natural gas heat input. These calculations are based on assumptions of: 1) a typical sCO2 power cycle has 500 MW gross power output and 64% efficiency; 2) conversion ratio of CH4 in DRM reactor is 20%, and 3) natural gas fuel has 100% CH4.

Figure 3:
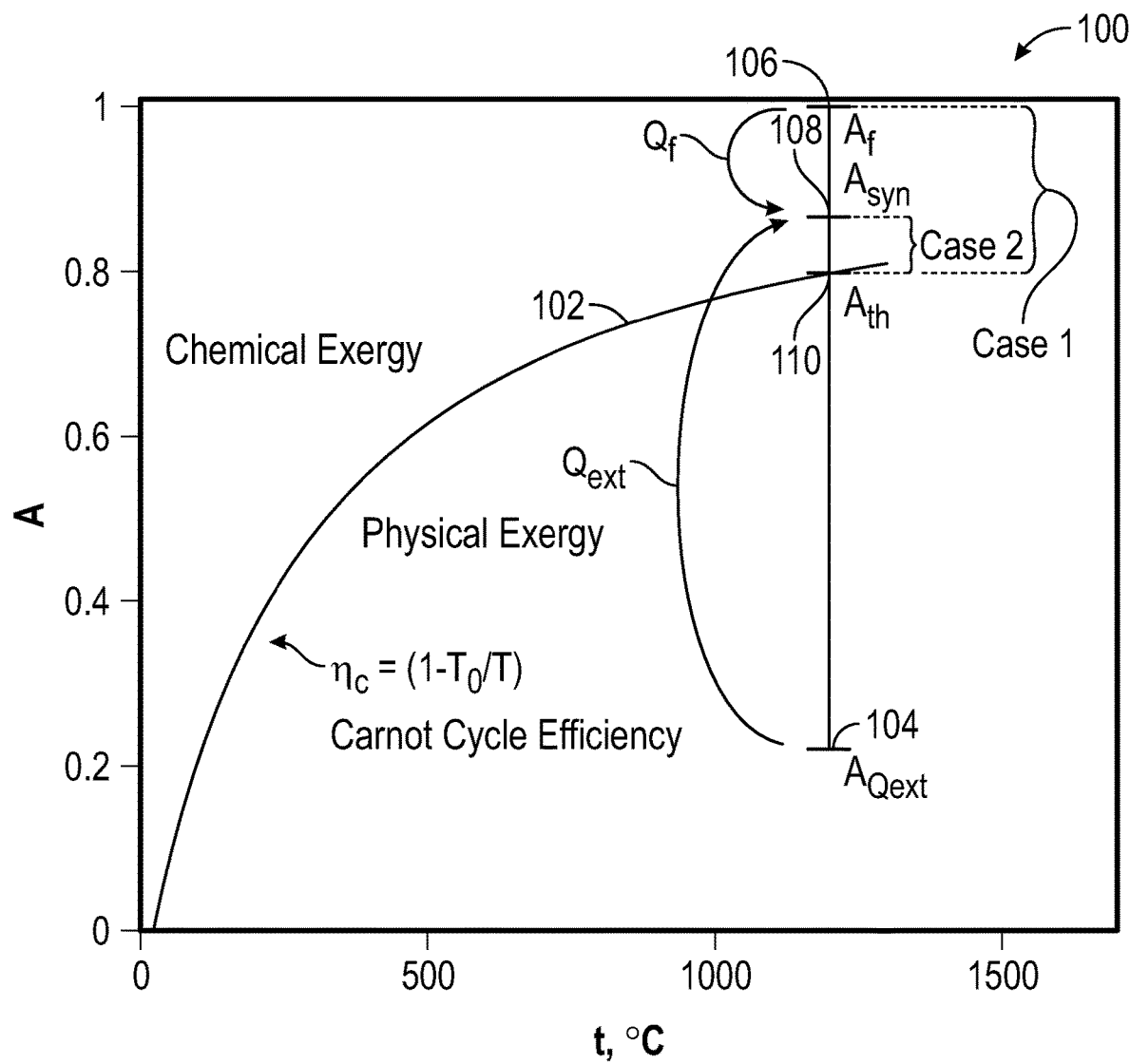
FIG. 3 is a schematic diagram illustrating a chart of energy level versus temperature for a typical supercritical CO2 power cycle of FIG. 1 and a supercritical CO2 power cycle incorporating a DRM reactor of FIG. 2.

FIG. 3 is a schematic diagram illustrating a chart 100 of energy level (A) versus temperature (t) for supercritical CO2 power cycle 10 and supercritical CO2 power cycle 10 incorporating DRM reactor 64. The x-axis of chart 100 indicates temperature (t) in degrees Celsius. The y-axis of chart 100 indicates energy level (A).

In viewpoint of exergy analysis, a gas turbine (GT) combustor usually has the highest exergy destruction. Minimization of exergy destruction in a GT combustor has the largest potential in performance improvement. Higher efficiency of Case 2 can be reasonably explained by a principle of cascade utilization with a combination of chemical exergy and physical exergy.

In FIG. 3, the A-t coordinates represent energy level and temperature, respectively. The area above the Carnot efficiency curve (IAC) 102 illustrates chemical exergy, while the area below shows physical exergy. The cascade utilization of physical exergy is achieved by optimizing sCO2 power cycle 10 based on the thermal energy levels. As for the chemical exergy of hydrocarbon fuels in combustion, their energy levels (Af) could be as high as about 1.0 (Case 1), while the energy level of syngas fuel (Asyn) has a value between 0.83 and 0.9 (Case 2), which depends on syngas composition. As a result, it is possible to effectively utilize the chemical exergy of fuels with different energy levels, similar to the cascade utilization of physical energy in the power cycle.

Chemical energy of hydrocarbon fuels is traditionally released through direct combustion and is utilized as a form of thermal exergy. Consequently, the higher energy level of hydrocarbon fuels Af is immediately degraded to the energy level of thermal energy Ath, resulting in greater energy destruction in fuel combustion (Af-Ath) as for Case 1.

Alternatively, the chemical exergy difference between Af and Asyn is used to convert methane fuel to syngas first, followed by syngas combustion (fuel indirect combustion) where the chemical exergy Asyn is released to the thermal energy level of Ath. The energy level degradation from chemical energy to thermal energy is much reduced (Asyn-Ath) as for Case 2. In examples, only 20% of methane is converted to syngas in DRNT reactor 64 (as discussed in Section 2.2), so the reduction in exergy loss is applicable to that portion of fuel.

According to FIG. 3, it is also noted that both fuel energy Qf and external heat energy Qext are added to the combustor for Case 2. Because of the cascade utilization of fuel chemical exergy, the external heat energy of Qext at lower grade AQext (0.22) is upgraded to the higher energy level Asyn (0.83-0.9), Therefore, it leads to the reduction of fuel consumption resulting in significant overall efficiency improvement for Case 2.

In sum, FIG. 3 shows, at point 104, low grade heat has lower energy level (AQext=0.22), while pure methane fuel has the highest energy level (Af=~1.0) at point 106 and syngas has reduced energy level (Asyn=0.83 to 0.9). Combustion of any type of fuel in combustor 12 experiences a loss of exergy. Thus, burning of methane fuel (Af) drops point 106 to point 110 (Ath) in combustor 12. However, burning of syngas (Asyn) drops point 108 to point 110 (Ath) in combustor 12. Thus, the exergy loss of dropping from point 108 to point 110 is less than dropping from point 106 to point 110, indicating that the burning of syngas is more effectively converted to useable energy in Case 2.

Figure 4:
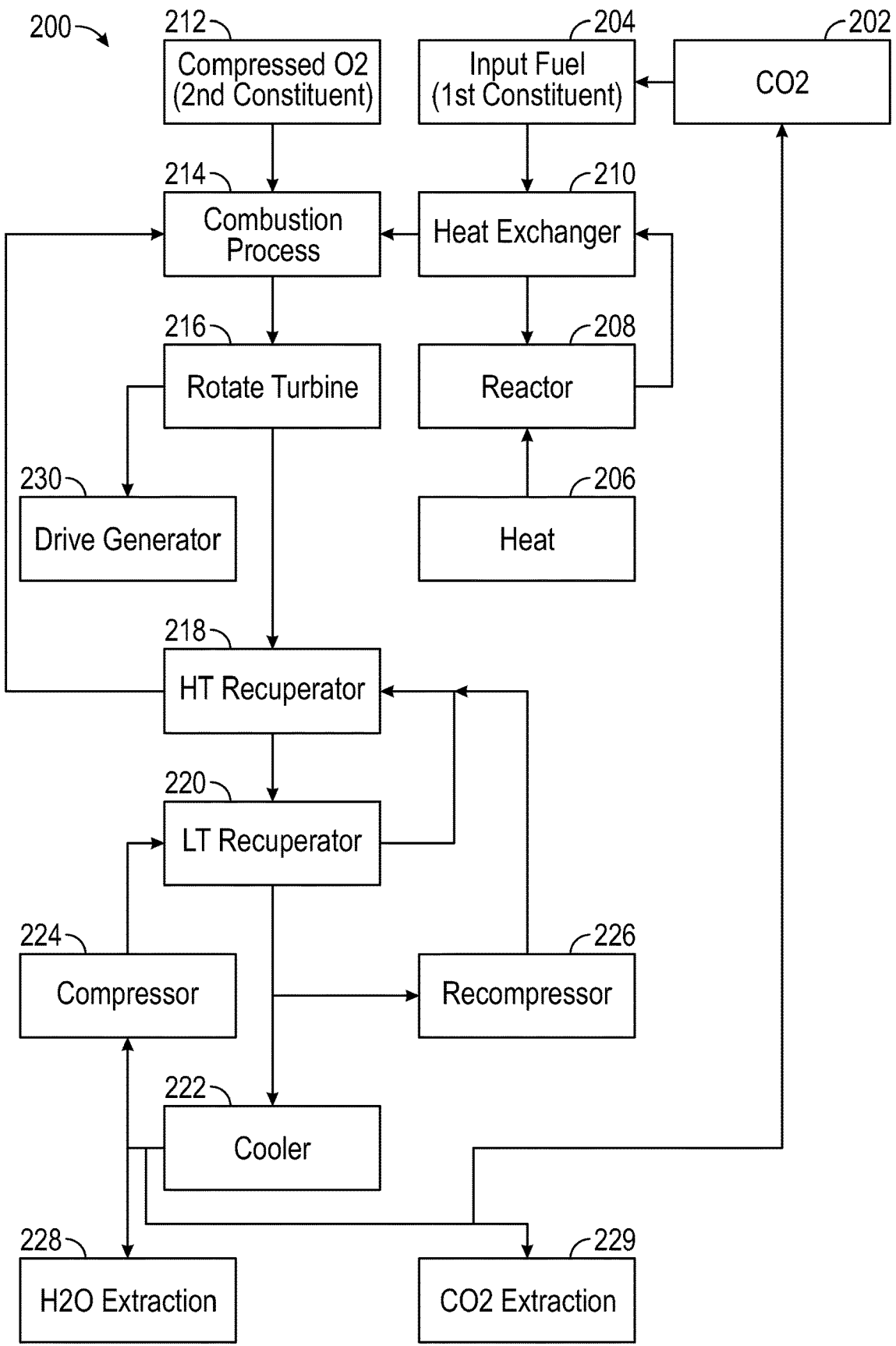
FIG. 4 is a line diagram illustrating steps of methods for operating a supercritical CO2 power cycle incorporating a DRM reactor.

FIG. 4 is a line diagram illustrating steps of method 200 for operating combined power system 62 including a supercritical CO2 power cycle 10 incorporating DRM system 60 according to the present disclosure.

At step 202, CO2 can be provided as a constituent component for a DRM reaction process. As discussed below, the CO2 can be supplied by method 200.

At step 204, fuel can be provided as a constituent component for the DRM reaction process. The fuel, which can comprise natural gas, can be supplied from an outside source, such as a pipeline or storage tanks. The CO2 of step 202 can be added to the fuel of step 204 for mixing in the DRM reaction process.

At step 206, heat can be provided to DRM reactor 64. As discussed above, this heat, e.g., Qext, can be provided by heat source 68, which can comprise free energy, such as solar energy, or not-free energy, such as heat harvested from an industrial process or power system.

At step 208, the mixed CO2 and fuel of steps 202 and 204 and the heat from step 206 can be combined to execute a DRM process in DRM reactor 64 to produce syngas (CO and H2) and methane (unreacted fuel).

At step 210, the outputs of DRM reactor 64, syngas and methane, are cooled in heat exchanger 66, thereby reducing compression work of fuel compressor 28. Simultaneously, the mixed CO2 and fuel of steps 202 and 204 can be heated in heat exchanger 66 before passing into DRM reactor 64, thereby facilitating efficient operation of DRM reactor 64 and reducing the amount of external heat Qext necessary to drive the DRM reaction. Thereafter, syngas, methane and CO2 are provided to combustor 12. Fuel compressor 28 can be used to provide fuel to combustor 12 at a desirable pressure for combustion.

At step 212, oxygen (O2) can be provided, along with the fuel, to combustor 12 for a combustion process. The oxygen can be supplied from an outside source, such as a pipeline or storage tanks. The oxygen can be compressed using oxygen compressor 26 to be provided to combustor 12 at a desirable pressure for combustion.

At step 214, the syngas, methane and oxygen can be burned in combustor 12 to produce an exhaust gas. The combustion of both syngas and methane can benefit from more energy input to combustor resulting from DRM reaction than burning of natural gas only, thereby improving the overall efficiency of sCO2 power cycle 10.

At step 216, high-pressure and high-temperature gas, comprising primarily CO2 and steam, can be used to turn turbine 14. Rotation of turbine 14 can be used to operate a generator (see step 230), compressor 16 and recompressor 18.

At step 218, the exhaust gas can be passed through a first recuperator. In an example, the first recuperator can comprise high temperature recuperator 20. The first recuperator can add heat to the operating fluid of power cycle 10 (e.g., CO2) entering combustor 12.

At step 220, the exhaust gas can be passed through a second recuperator. In an example, the second recuperator can comprise low temperature recuperator 22. The second recuperator can add heat to the operating fluid of power cycle 10 (e.g., CO2) entering the first (high temperature) recuperator 20.

Recuperator 20 can be characterized as "high temperature" because the exhaust gas passing through recuperator 20 is directly out of turbine 14 and is therefore hotter than when exhaust gas enters recuperator 22, the "low temperature" recuperator.

At step 222, a first portion of exhaust gas leaving recuperator 22 can enter cooler 24. Cooler 24 can be used to condense steam within the working fluid of power cycle 10 into water.

At step 224, the first portion of the exhaust gas leaving cooler 24 can enter compressor 16, The first portion of the exhaust gas leaving compressor 16 can enter recuperator 22 before passing through recuperator 20 to be placed in thermal communication with the original stream of exhaust gas at step 218. Recuperators 22 and 20 can heat the first portion of the exhaust gas before entering into combustor 12.

At step 226, a second portion of the exhaust gas leaving recuperator 22 can enter recompressor 18. The second portion of the exhaust gas leaving recuperator 22 and recompressor 18 can enter high temperature recuperator 20 to be placed in thermal communication with the original stream of exhaust gas at step 218. Recuperator 20 can heat the second portion of the exhaust gas before entering into combustor 12.

At step 228, water, e.g., liquid H2O, can be extracted from the first portion of the exhaust gas for an external application. In an example application, the H2O can be stored. Removal of water from the working fluid can allow for the extraction of pure or nearly pure CO2 at step 229.

At step 229, CO2, can be extracted from the first portion of the exhaust gas for use in an external application. The external application can simply comprise storage for use in another process at the location of power cycle 10 or storage in containers from transport to another location. In examples, the application can comprise direct use in another application without storage, such as in an industrial process. In an example, the CO2 can be used in an Enhanced Oil Recovery (EOR) process. However, a portion of the CO2 can be returned to method 200 for use in the DRM reactor ant step 202.

At step 230, generator 30 can be driven with turbine 14 via shaft 32. Generator 30 can be used to produce electricity that can, for example, be provided to a power grid.

The present disclosure indicates that combined power system 62, e.g., the combination of sCO2 power cycle 10 and DRM system 60, can achieve a significant performance improvement compared to standalone operation of a sCO2 power cycle. Overall efficiency can be increased by 3.4% points (debit of Qext not considered) or 2.0% points (debit of Qext considered) respectively.

The performance calculation of FIG. 2 is based on: a) sCO2 power cycle efficiency of 64% with 1200° C. TIt; b) conversion ratio of CH4 in DRM reactor of 20%, However, sCO2 power cycle efficiency can be further increased along with higher TIt. Conversion ratio of CH4 in DRM could go higher if a new catalyst were developed. Based on the calculations, values of efficiency increase could be 5.7% points or 3.6% points, respectively, if sCO2 power cycle efficiency of 70% and CH4 conversion ratio of 30% were assumed. Therefore, even greater potential in performance improvement can be predicted for application of this new concept.

The study is based on a typical sCO2 power cycle scheme as presented. It is understood there are a variety of power cycle schemes (supercritical CO2 cycles or subcritical CO2 cycles) using CO2 as working fluid which the proposed integration concept should be all applicable.

Various Notes & Examples

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(1)), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A supercritical CO2 cycle power plant, comprising:
   a combustor configured to combust first and second input constituents to generate a gas stream;
   a turbine configured to be rotated by the gas stream;
   a compressor configured to receive a first portion of the gas stream from the turbine and provide a first stream of compressed gas to the combustor;
   a recompressor configured to receive a second portion of the gas stream from the turbine and provide a second stream of compressed gas to the combustor;
   an electrical generator configured to be driven by the turbine;
   a methane reforming reactor configured to dry reform methane to provide the first input constituent; and
   a heat exchanger positioned fluidly between the methane reforming reactor and the combustor, the heat exchanger configured to receive an input of a fuel at a first inlet and an input of the first input constituent at a second inlet, the heat exchanger configured to place the fuel and the first input constituent in thermal communication.

2. The supercritical CO2 cycle power plant of claim 1, wherein the heat exchanger transfers heat from the first input constituent to the fuel, thereby reducing a temperature of the first input constituent and increasing a temperature of the fuel.

3. The supercritical CO2 cycle power plant of claim 1, further comprising:
   an outlet for extracting CO2 from the supercritical CO2 cycle power plant; and
   a flow line connecting the outlet to the first inlet of the heat exchanger.

4. The supercritical CO2 cycle power plant of claim 3, wherein the fuel comprises natural gas, and the methane reforming reactor is configured to produce the first input constituent comprising CO and H2 from CO2 and natural gas.

5. The supercritical CO2 cycle power plant of claim 1, further comprising a heat source configured to input heat to the methane reforming reactor.

6. The supercritical CO2 cycle power plant of claim 5, wherein the heat source comprises heat from an industrial process or steam from a power plant.

7. The supercritical CO2 cycle power plant of claim 1, further comprising:
   a first recuperator configured to exchange heat between the gas stream and the second stream of compressed gas; and
   a second recuperator configured to exchange heat between the gas stream and a recombination of the first stream of compressed gas and the second stream of compressed gas.

8. The supercritical CO2 cycle power plant of claim 1 further comprising:
   a cooler configured to cool the first portion of the gas stream; and
   an outlet for removing separated water from the supercritical CO2 cycle power plant downstream of the cooler.

9. The supercritical CO2 cycle power plant of claim 1, comprising: a supercritical CO2 power cycle configured to produce the gas stream, the gas stream including CO2, the supercritical CO2 power cycle comprising the combustor, the compressor and the turbine; and the methane reforming reactor configured to dry reform the methane using CO2 from the gas stream to provide the first input constituent to a combustion process of the supercritical CO2 power cycle, the first input constituent comprises: a synthesis gas.

10. The supercritical CO2 cycle power plant of claim 9, wherein the heat exchanger exchanges heat between the synthesis gas and the methane before the combustion process.

11. The supercritical CO2 cycle power plant of claim 10, further comprising: an external heat source in thermal communication with the methane reforming reactor.

12. A method of operating a supercritical CO2 cycle power plant, the supercritical CO2 cycle power plant comprising:
   a combustor configured to combust first and second input constituents to generate a gas stream;
   a turbine configured to be rotated by the gas stream;
   a compressor configured to receive a first portion of the gas stream from the turbine and provide a first stream of compressed gas to the combustor;
   a recom pressor configured to receive a second portion of the gas stream from the turbine and provide a second stream of compressed gas to the combustor;
   an electrical generator configured to be driven by the turbine;
   a methane reforming reactor configured to dry reform methane to provide the first input constituent; and
   a heat exchanger positioned fluidly between the methane reforming reactor and the combustor, the heat exchanger configured to receive an input of a fuel at first inlet and an input of the first input constituent at a second inlet, the heat exchanger configured to place the fuel and the first input constituent in thermal communication, the method comprising:

reacting the fuel and CO2 to produce the first input constituent in the methane reforming reactor;

mixing the first input constituent with the second input constituent to execute a combustion process in the combustor and generate the gas stream;

turning the turbine with the gas stream;

driving the electrical generator with the turbine;

routing the first portion of the gas stream and the second portion of the gas stream through the compressor and recompressor, respectively, to generate the first stream of compressed gas and the second stream of compressed gas; and routing the the first stream of compressed gas and the second stream of compressed gas through a two-stage recuperation process to provide the CO2 to the combustor.

13. The method of claim 12, further comprising recycling a portion of the CO2 from the gas stream to the methane reforming reactor.

14. The method of claim 12, wherein the fuel is heated by the first input constituent.

15. The method of claim 12, further comprising adding heat to the methane reforming reactor from an external source.

16. The method of claim 15, wherein the external source comprises heat from an industrial process or steam from a power plant.

17. The method of claim 12, wherein the two-stage recuperation process comprises: a first recuperator configured to exchange heat between the gas stream and the first stream of compressed gas; and a second recuperator configured to exchange heat between the gas stream and the first stream of compressed gas and the second stream of compressed gas.

18. The method of claim 12, further comprising bypassing the methane reforming reactor with a fuel inlet to the combustor.

19. The method of claim 12, further comprising: removing a portion of the CO2 from the gas stream from the supercritical CO2 cycle power plant; and condensing moisture from the gas stream for separation of water from the supercritical cycle power plant.

20. A method of operating a supercritical CO2 cycle power plant, the supercritical CO2 cycle power plant comprising:

a combustor configured to combust first and second input constituents to generate a gas stream;

a turbine configured to be rotated by the gas stream;

a compressor configured to receive a first portion of the gas stream from the turbine and provide a first stream of compressed gas to the combustor;

a recompressor configured to receive a second portion of the gas stream from the turbine and provide a second stream of compressed gas to the combustor;

an electrical generator configured to be driven by the turbine;

a methane reforming reactor configured to dry reform methane to provide the first input constituent; and a heat exchanger positioned fluidly between the methane reforming reactor and the combustor, the heat exchanger configured to receive an input of a fuel, the fuel comprising the methane, at first inlet and an input of the first input constituent at a second inlet, the heat exchanger configured to place the fuel and the first input constituent in thermal communication, the method comprising: operating a supercritical CO2 power cycle to turn the turbine;

driving the electrical generator with the turbine;

extracting CO2 byproduct from the supercritical CO2 power cycle;

reacting the fuel and a portion of the CO2 byproduct with the methane reforming reactor to produce the first input constituent;

mixing the first input constituent with the second input constituent to execute a combustion process for the supercritical CO2 power cycle.

21. The method of claim 20, wherein the heat is exchanged from the first input constituent to the fuel, thereby reducing a temperature of the first input constituent and increasing a temperature of the fuel.

22. The method of claim 20, further comprising adding heat to the methane reforming reactor from an external source.

* * * * *